(12) United States Patent
Oliver et al.

(10) Patent No.: US 7,185,837 B2
(45) Date of Patent: Mar. 6, 2007

(54) SPILL-RESISTANT MATERIAL MILLING PROCESSOR

(75) Inventors: John Oliver, Boca Raton, FL (US);
Augusto Picozza, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 10/833,583

(22) Filed: Apr. 27, 2004

(65) Prior Publication Data

US 2005/0263637 A1    Dec. 1, 2005

(51) Int. Cl.
*B02C 18/12*    (2006.01)

(52) U.S. Cl. .................. 241/282.1; 241/285.3

(58) Field of Classification Search ............... 241/92, 241/100, 282.1, 282.2, 285.1, 285.2, 285.3, 241/382.1
See application file for complete search history.

(56) References Cited

U.S. PATENT DOCUMENTS

| | | | |
|---|---|---|---|
| 2,805,561 A | 9/1957 | Emmert et al. | |
| 2,982,483 A | 5/1961 | Heinemans | |
| 3,089,652 A | 5/1963 | Haber | |
| 3,559,850 A | 2/1971 | Barkin et al. | |
| 3,861,565 A | 1/1975 | Rickmeier, Jr. | |
| 3,892,365 A | 7/1975 | Verdun | |
| 4,101,082 A | 7/1978 | Mayer et al. | |
| 4,200,240 A | 4/1980 | Machuron | |
| 4,226,669 A | 10/1980 | Vilardi | |
| 4,335,860 A | 6/1982 | Grandel et al. | |
| 4,600,155 A * | 7/1986 | Bos et al. | 241/37.5 |
| 4,927,047 A | 5/1990 | Stuber et al. | |
| D336,212 S | 6/1993 | Classen | |
| 5,383,613 A * | 1/1995 | Sundquist | 241/37.5 |
| D410,171 S | 5/1999 | Lallemand | |
| 6,377,022 B1 | 4/2002 | Rhoads | |
| D457,379 S | 5/2002 | Jorgensen | |
| 6,748,853 B1 * | 6/2004 | Brady et al. | 99/492 |
| 6,971,597 B2 * | 12/2005 | Starr | 241/92 |

* cited by examiner

*Primary Examiner*—Mark Rosenbaum
(74) *Attorney, Agent, or Firm*—Lawrence J. Shurupoff

(57) ABSTRACT

A spill-resistant material processor includes a vessel having an opening with a funnel-shaped rim, a lid, a processing blade rotationally mounted within the vessel, and a base having a motor therein to drive the processing blade and process any material within the vessel. The processor is particularly adapted to cut and mill coffee beans and avoid spillage of milled coffee from the lid and the vessel.

16 Claims, 7 Drawing Sheets

SPILL-RESISTANT MATERIAL MILLING PROCESSOR

BACKGROUND OF THE DISCLOSURE

1. Field of the Invention

This present invention relates to material milling processors, such as coffee mills, that are resistant to spillage.

2. Description of the Related Art

Coffee mills are well known popular household appliances. Commonly, a coffee mill includes a unitary vessel with a chopping blade and a close-fitting lid. The user places coffee beans into the mill, closes the lid, and turns on an electric motor. It typically takes less than a minute to reduce the beans to coffee grounds, with the result that the interior of the vessel and the interior of the lid is coated with coffee grounds.

A problem for the user arises when attempting to open the vessel and pour the grounds into a coffee brewing machine. Because of the nearly complete coating of the interior of the vessel and lid, coffee grounds typically spill out onto the kitchen counter as they suddenly break loose rather than flow freely from the vessel. This creates an annoying clean-up problem because the grounds are fine enough to get into cracks and crevices about the kitchen counter and because the grounds are not soluble in water, making them difficult to wipe up.

BRIEF SUMMARY OF THE DISCLOSURE

A spill-resistant material processor includes a vessel having an opening with a funnel-shaped rim, a lid overlying the opening and located substantially within the rim, a processing blade rotationally mounted within the vessel, and a base having a motor therein to drive the processing blade and thereby process any material within the vessel.

In another aspect of the invention, the lid is pivotably hinged to the vessel.

In another aspect of the invention a scraper is provided within the vessel. The scraper is shaped to conform to the walls of the vessel and is engageable with the lid such that a rotational motion of the lid is effective in scraping the interior surface of the vessel.

In another aspect of the invention, the funneled rim is removeably mounted on the vessel.

In another aspect of the invention, a scraper is mounted within the vessel. The scraper is shaped to complement or match the walls of the vessel and engage with the funneled rim such that a rotational motion of the funneled rim is effective in scraping the interior surface of the vessel.

In one embodiment of the spill-resistant material processor includes a rotatable lid, a processing blade rotationally mounted within the vessel, a base having a motor therein to drive the processing blade and thereby process material within the vessel, and a scraper within the vessel that is shaped to the walls of the vessel and engageable with the lid, such that a rotational motion of the lid is effective in scraping material from the interior surface of the vessel.

In another aspect of the invention, the vessel is removable from the base.

In another aspect of the invention, the material to be processed is coffee beans and the material to be scraped is ground coffee.

In another aspect of the invention, an axially-slideable interconnection is provided between a lid or cap assembly and a vessel which holds material ground by the processor.

In another embodiment of the invention spill-resistant material processor includes a vessel having an opening with a rotatable funnel-shaped rim, a lid overlying the opening and located substantially within the rim, a processing blade rotationally mounted within the vessel, a base having a motor therein to drive the processing blade and thereby process material within the vessel, and a scraper within the vessel that is shaped to the walls of the vessel and engageable with the funneled rim, such that a rotational motion of the rim is effective in scraping material from the interior surface of the vessel.

BRIEF DESCRIPTION OF THE DRAWINGS

FIG. 1b is an enlarged view of region A of FIG. 1a.

DETAILED DESCRIPTION OF THE PREFERRED EMBODIMENTS

Figure 1A:
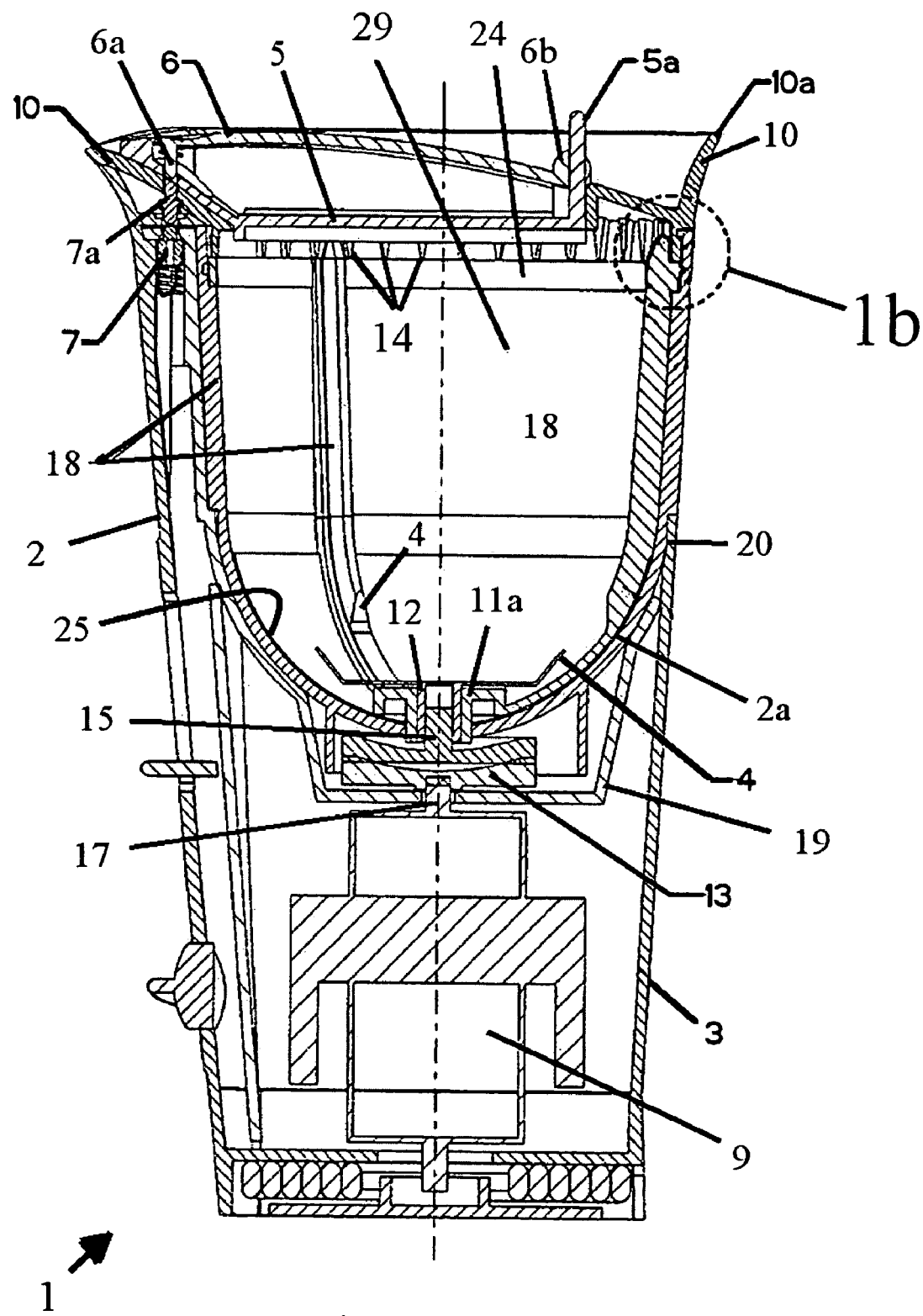
FIG. 1a is a cross-sectional side view of an embodiment of a coffee mill with a funnel-shaped rim and hinged lid constructed in accordance with the invention.

As shown in FIG. 1a, a material processor 1, such as a coffee mill, has a housing or vessel 2 mounted upon a base 3. The base 3 has a motor 9 mounted within it that drives a processing blade 4 rotationally mounted within the vessel 2 so as to cut, grind and process any material placed within the vessel 2. A lid 5 is hinged to a funnel-shaped outwardly-flaring rim 10, as discussed further below. In a preferred embodiment, an elongate power switch lever 6 is hinged to the lid 5 at hinge 6b.

Vessel 2 can be made of a thermoplastic polymer, which is subject to wear and tear near the processing blade 4 because of the vigorous movement of processed material fragments in that region due to the chopping action of the processing blade 4. It is therefore desirable to introduce a wear-resistant vessel liner 2a at the bottom of the vessel chamber to protect against this. The wear-resistant liner is preferably made of stainless steel. The shaft 15 which drives the blade 4 projects through a hole in the bottom of the wear-resistant vessel liner 2a.

A safety interlock is preferably provided so that the user cannot activate the motor 9 when the lid 5 is pivoted open. One way to do this is to provide a downwardly depending plunger 6a on the end of power lever 6. Plunger 6a passes through an opening in the lid 5 and rim 10, such that the plunger 6a is positioned to activate an internal power switch 7 mounted on a cup-shaped base liner 19. The plunger 6a activates switch 7 via an upwardly biased spring-loaded intermediary shaft segment 7a that transmits the force on the plunger through the funneled rim 10. Hence, a user can only activate the power switch 7 when the lid 5 is closed.

The vessel 2 is provided with a funnel-shaped rim 10, meaning a substantially frustoconical radially outwardly-flaring rim that supports the lid 5 and rims the opening of the vessel 2. The lid 5 and power lever 6 are preferably sized and shaped to be substantially, and preferably completely, contained within or surrounded by a perimeter wall formed by the lip 10a defined by the funneled rim 10. As seen in FIGS.

2a, 4, 5 and 6, a hinged connection 8 is provided between the rim 10 and lid 5 to allow the lid 5 to pivot over the vessel chamber 29. A finger tab 5a may be provided on the lid 5 to facilitate pivoting the lid 5 open.

Figure 5:
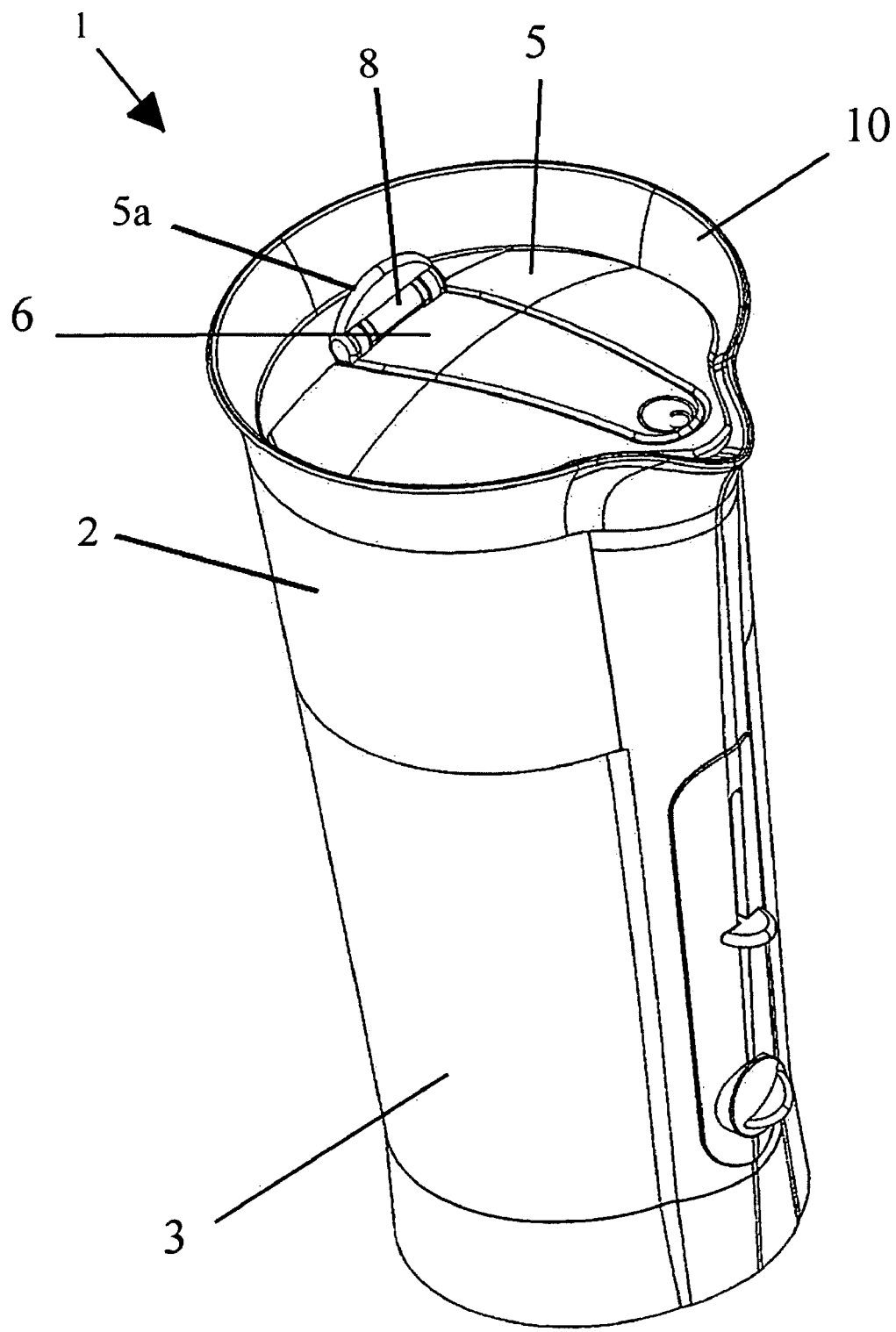
FIGS. 5 and 6 are perspective views of the embodiment of FIG. 1.
Figure 6:
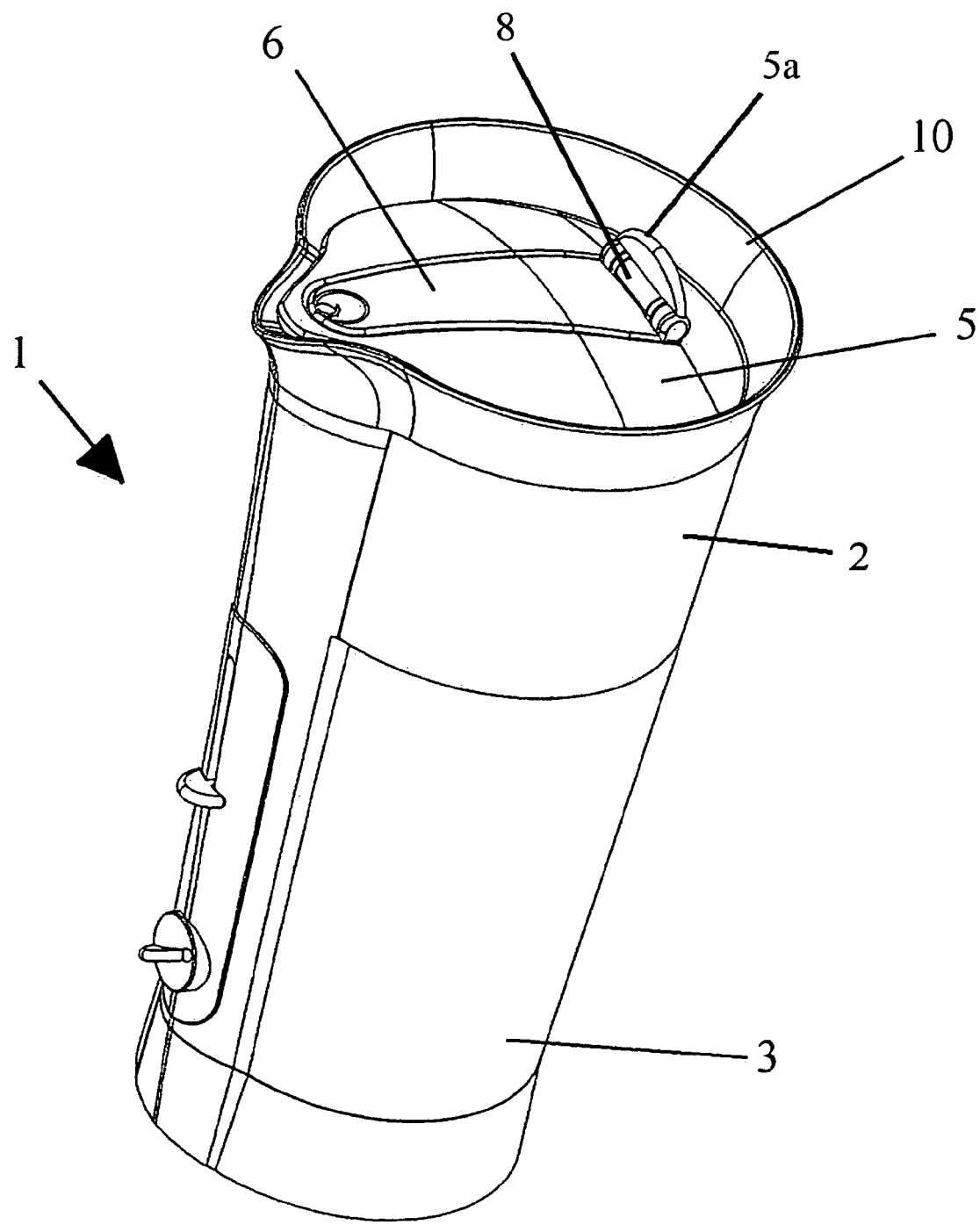

As can be best appreciated from a review of FIGS. 5 and 6, when the user pivots open the lid 5, processed materials (e.g., coffee grounds) that have become stuck to the inner surface of the lid 5 during grinding will tend to fall back into the chamber of vessel 2. Any material that tends to fall outside the vessel 2 is caught by the funneled rim 10 and will therefore also tend to return to the vessel 2 via funnel-directed flow. The lateral or circumferential dimensions of the edge or lip 10a of the funnel-shaped rim 10 are substantially larger than those of lid 5 so as to return substantially all processed material back into the vessel 2. For example, the rim 10 can extend radially outwardly about ¼ inch to ½ inch, or more, further than the periphery of the lid 5.

Figure 3:
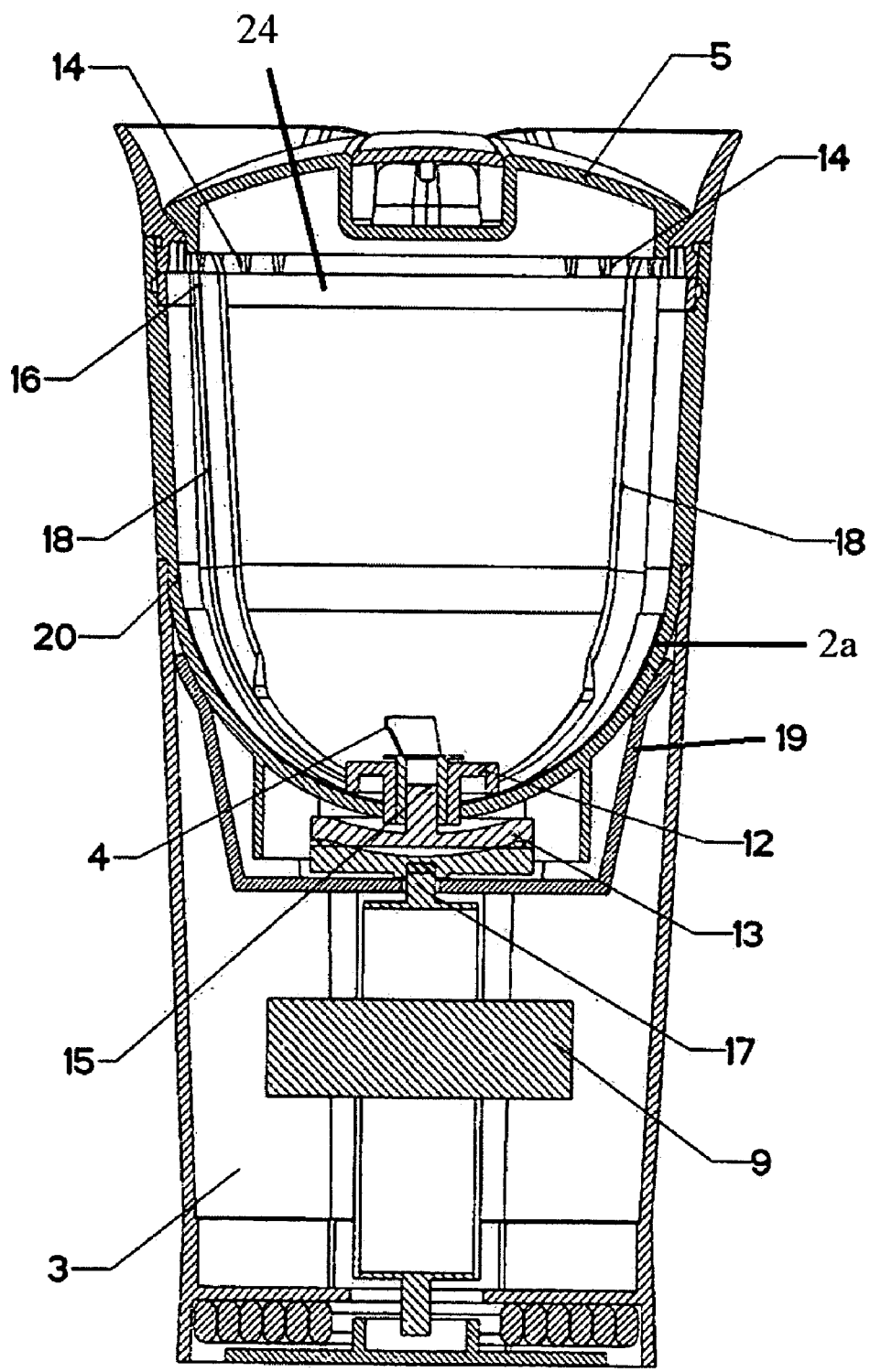
FIG. 3 is a cross-sectional view of the coffee mill of the invention taken at a right angle to the view of FIG. 1.
Figure 4:
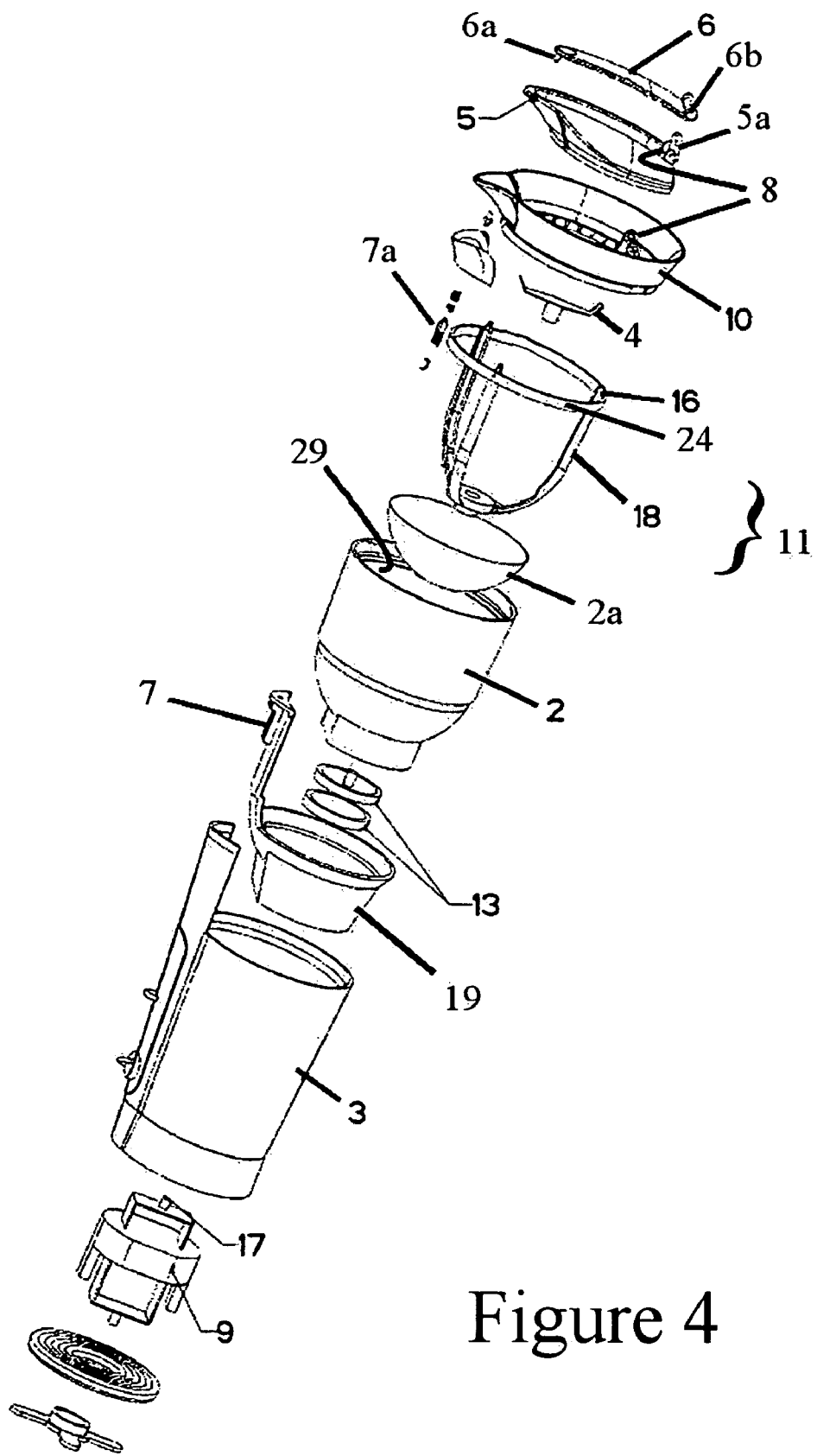
FIG. 4 is an exploded view of the embodiment of FIG. 1.

As seen in FIGS. 1a and 3, the vessel 2 is detachable from the base 3. This has the advantage of providing the user with a lighter weight container because the heavy motor 9 remains in the base 3. The result is that the user may more easily and carefully handle and manipulate the lightweight vessel 2 so as to avoid spillage. As seen in FIGS. 1a and 4, a simple axially-sliding splined or geared drive connection 13 may be provided between base 3 and vessel 2 to allow for easy removal of the vessel 2 from the base 3.

The base 3 may be shaped to directly support the vessel 2 or, alternatively, a vessel receiver or base liner 19 may be provided to simplify assembly. Here, the base 3 is shaped to receive the motor 9 and after installation of the motor 9, the vessel receiving liner or base liner 19, which is shaped to receive the vessel 2 is then installed.

Figure 1B:
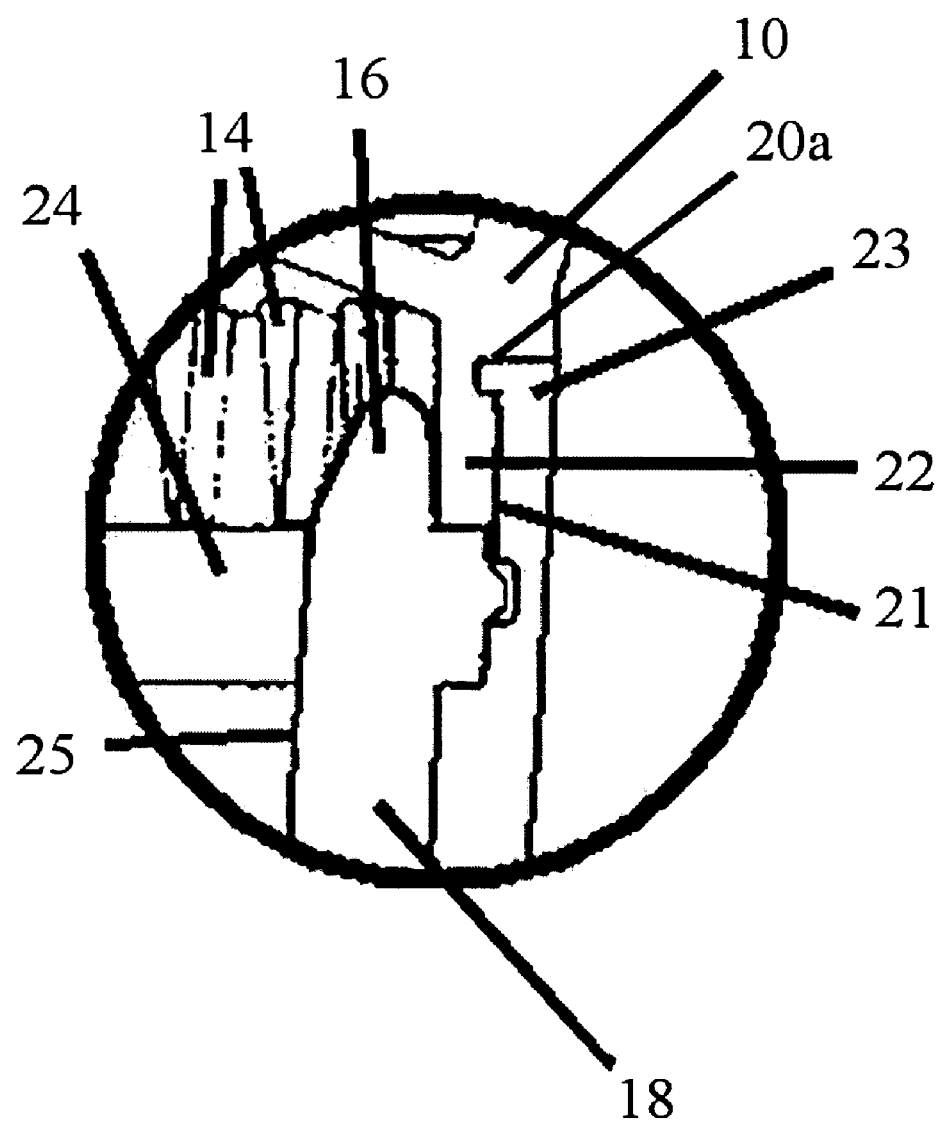

The funneled rim 10 is preferably removable from the vessel 2. This is because the lid 5 is hinged to the funneled rim 10 and would not otherwise be easily removable for cleaning or dishwashing. As seen in FIG. 1b, a simple axially-sliding cylindrical tongue-and-groove interconnection 22, 23 may be provided between the funneled rim 10 and vessel 2 for facilitating removal and installation of the lid 5 and rim 10 assembly with respect to vessel 2. As an option, a bayonet connection 20a may be provided to axially lock the rim 10 to the vessel 2.

As seen in FIGS. 1a and 4, the processor 1 has a scraper 11 with scraper blades 18 disposed within the vessel 2. The scraper has one or more finger-like scraper blades 18 shaped to closely match the bowl-shaped contour of the interior wall of the vessel 2. The scraper 11 has a hub 11a freely rotatably mounted and centered about the blade shaft 15. A bushing or journal 12 is provided with a clearance sufficient to permit free rotation of the hub around the blade shaft 15.

The scraper 11 is preferably designed to detachably engage with or slidably connect to the funneled rim 10 at appropriately configured connection points when the funneled rim 10 is placed on the vessel 2. The connection is configured such that a rotational motion of the funneled rim 10 by a user causes the scraper blades 18 to rotate and remove or scrape any processed material that has adhered to the inner walls 25 of the vessel chamber 29.

Figure 2A:
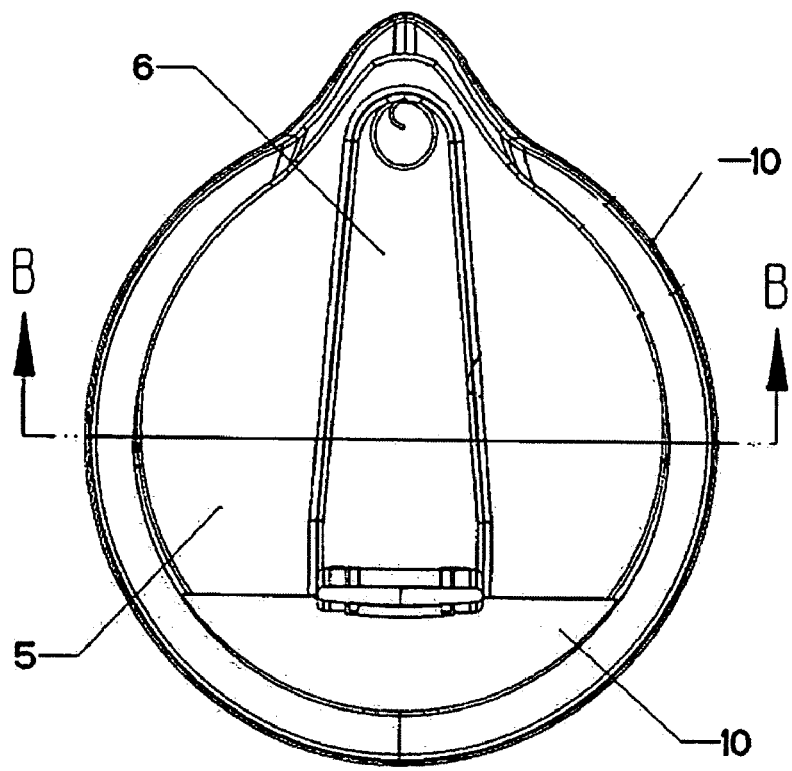
FIGS. 2a and 2b respectively show a top plan view and a partial vertical cross-sectional front view of the coffee mill of FIG. 1.
Figure 2B:
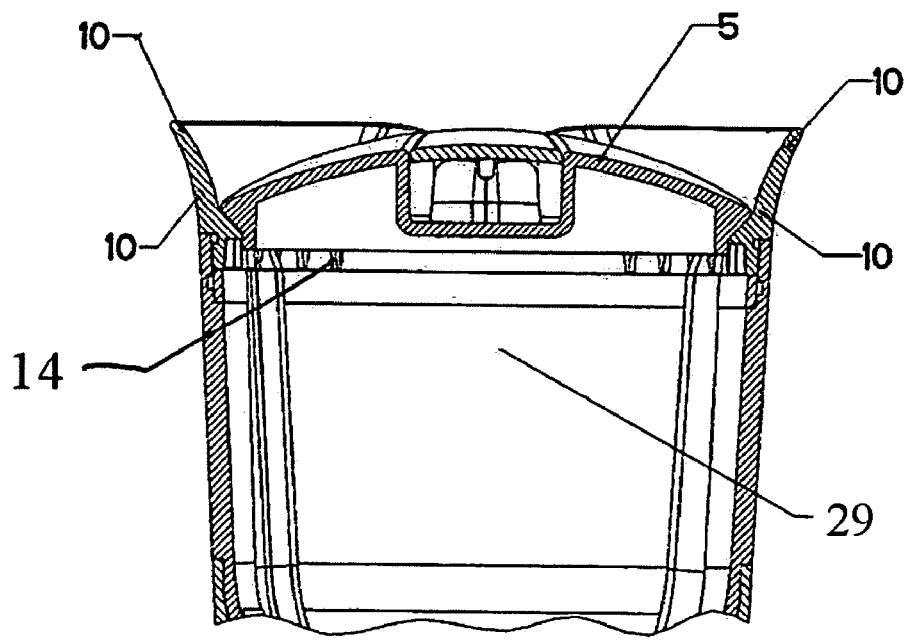

For example, as shown in FIGS. 1a, 1b and 2b, the inner rim wall of the funneled rim 10 may be provided with one or more cogs or vanes 14 that drivingly engage and push against an upper free end portion 16 of the scraper blades 18 of the scraper 11. The funneled rim 10 is rotationally mounted with a light telescopic friction interfit to the top of vessel 2, as can be more clearly seen in FIG. 1b. The funneled rim 10 is circular at its base and has a cylindrical flange 22 (FIG. 1b) that preferably snap-fits within an annular recess 21 at the upper vessel rim 23 of the vessel 2. As noted above, a bayonet connection is also possible. The annular recess 21 is large enough to also accommodate a scraper ring 24, which serves the purpose of keeping the scraper blades 18 in fixed position relative to one another and strengthening the structure of scraper 11.

The rotation of the funneled rim 10 need not be a full 360° to scrape the entire inner surface 25 of vessel chamber 29, if more than one scraper blade is provided. For example, if only two diametrically-opposed scraper blades are provided, they need be rotated only 180° each to fully scrape the inner wall of vessel chamber 9. Likewise, three scraper blades, as shown, need only be rotated 120°.

The scraper 11 is not only useful for getting all of the processed material out of the vessel 2, but also works to reduce spillage. Clumps or layers of material, such as coffee grinds, stuck to the vessel wall 25 tend to suddenly come loose and fall or spill out of the vessel 2 unexpectedly, such as when the user does not have the vessel 2 properly positioned during its emptying. Scraping this material into vessel 2 prevents such spillage.

As can be further seen in FIGS. 1a and 3, the vessel 2 may optionally be designed to be separable from the base 3 simply by providing an interlocking motor shaft 17 and blade shaft 15. A geared or splined axially-sliding interconnecting coupling 13 may be provided similar to the prior example. An annular axially-sliding tongue and groove friction-fit or splined interconnection 20 is provided to removeably secure the vessel 2 to the base 3. A bayonet connection similar to connection 22, 23 in FIG. 1b may also be provided for added retention of the vessel 2 on the base 3.

Of course, the disclosures herein need not be limited to coffee mills, but may find application to other types of food processors and even to devices for processing chemicals or other non-edible materials where it is desirable to reduce spillage.

While various values, scalar and otherwise, may be disclosed herein, it is to be understood that these are not exact values, but rather to be interpreted as "about" such values, unless explicitly stated otherwise. Further, the use of a modifier such as "about" or "approximately" in this specification with respect to any value is not to imply that the absence of such a modifier with respect to another value indicated the latter to be exact.

Changes and modifications can be made by those skilled in the art to the embodiments as disclosed herein and such examples, illustrations, and theories are for explanatory purposes and are not intended to limit the scope of the claims. Further, the abstract of this disclosure is provided for the sole purpose of complying with the rules requiring an abstract so as to allow a searcher or other reader to quickly ascertain the subject matter of the disclosures contained herein and is submitted with the express understanding that it will not be used to interpret or to limit the scope or the meaning of the claims.

What is claimed is:

1. A spill-resistant material processor, comprising:
   a vessel having an interior wall defining an opening;
   a rotatable rim surrounding the opening;
   a pivotable lid overlying said opening and located substantially within said rim and pivotable about said rim;
   a processing blade rotationally mounted within the vessel;
   a base having a motor therein to drive the processing blade and thereby process any material within the vessel; and a scraper disposed within the vessel that is shaped to conform to the interior wall of the vessel and engageable with either the lid or rim such that a rotational motion of the lid or rim to which the scraper is engaged is effective in scraping the interior surface of the vessel.

2. The processor of claim 1 wherein the vessel is removable from the base.

3. The processor of claim 1 wherein the lid is pivotably hinged to the vessel.

4. The processor of claim 3 wherein the lid is pivotably hinged to the vessel via the rim.

5. The processor of claim 1 wherein the rim comprises a funnel-shaped rim.

6. The processor of claim 1 wherein the rim is removably mounted on said vessel.

7. The processor of claim 6, further comprising an axially slideable interconnection provided between said rim and said vessel.

8. A spill-resistant material processor, comprising:
- a vessel having an interior wall;
- a rotatable lid rotatable about a vertical axis and pivotable about an axis transverse to said vertical axis;
- a processing blade rotationally arranged within the vessel;
- a base having a motor therein to drive the processing blade and thereby process material within the vessel; and
- a scraper within the vessel that is shaped to the interior wall of the vessel and engageable with the lid, such that a rotational motion of the lid is effective in scraping material from the interior wall of the vessel.

9. The processor of claim 8 wherein the vessel is removable from the base.

10. The processor of claim 8 wherein the material to be processed is coffee beans and the material to be scraped is ground coffee.

11. The processor of claim 8, further comprising an axially slideable interconnection provided between said lid and said vessel.

12. The processor of claim 8 wherein the lid engages the scraper via a funneled rim.

13. A spill-resistant material processor, comprising:
- a vessel having an opening surrounded by a rotatable funnel-shaped rim;
- a lid overlying said opening and located substantially within said funneled rim;
- a hinge connected to said lid to allow said lid to pivot over said opening;
- a processing blade rotationally mounted within said vessel;
- a base having a motor therein to drive said processing blade and thereby process material within the vessel; and
- a scraper within said vessel that is shaped to the wall of the vessel and engageable with the rim, such that a rotational motion of the rim is effective in scraping material from interior surfaces of the vessel.

14. The processor of claim 13 wherein the vessel is removable from the base.

15. The processor of claim 13 wherein the material to be processed is coffee beans and the material to be scraped is ground coffee.

16. The processor of claim 13, further comprising an axially slideable interconnection provided between said lid and said vessel.

* * * * *